July 9, 1963 R. J. HARWOOD 3,096,852
WHEEL MOUNTING MEANS
Filed Sept. 26, 1960
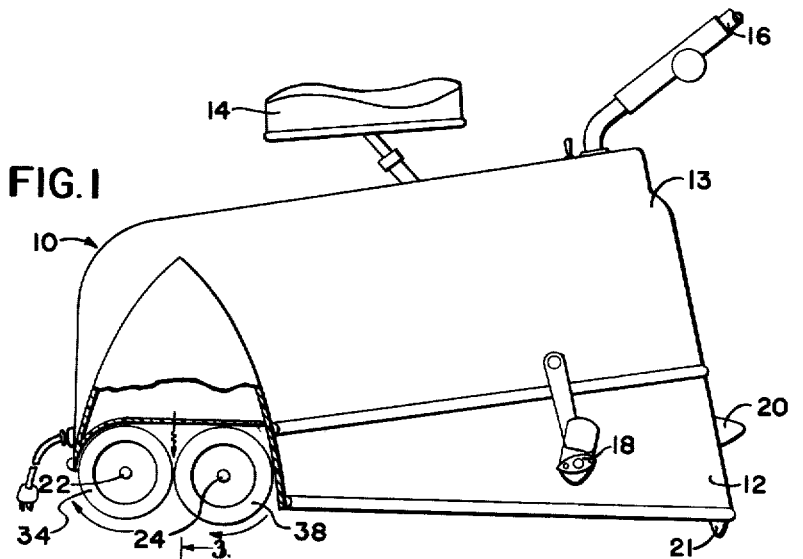
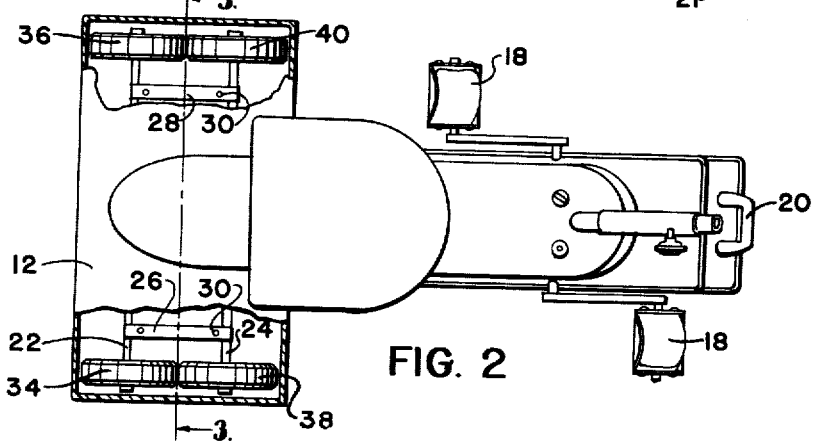
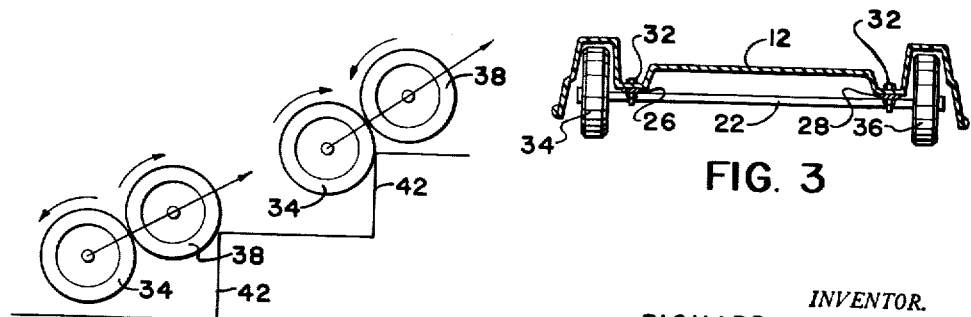
INVENTOR.
RICHARD J. HARWOOD
BY John H. Wilkinson
ATTORNEY

United States Patent Office

3,096,852
Patented July 9, 1963

3,096,852
WHEEL MOUNTING MEANS
Richard J. Harwood, 1 Hawthorne, Wichita, Kans.
Filed Sept. 26, 1960, Ser. No. 58,414
7 Claims. (Cl. 188—1)

This invention relates to mounting means, and more particularly to wheeled mounting means. In a still more specific aspect, the invention relates to wheeled mounting means for use on portable articles in which the wheels are locked during normal use of the article to prevent movement thereof, and can be disengaged for movement of the article. In a further aspect, the invention relates to mounting means particularly suitable for use on exercise machines and the like.

Various types of wheeled mounting means are known in the prior art. These primarily consist of the conventional mounting means wherein an axle is secured to the article and has wheels rotatably mounted thereon. While such a mounting is sufficient for use with articles being continually moved or where movement of the article during use is no detrimental, such mounting means are unsatisfactory if it is desirable to maintain the portable article in a stationary position for any length of time. Also, mounting means are known including wheeled mounting means which are locked or lifted from the supporting surface during periods of use of the supported article. Such are relatively expensive to construct and mount and require positioning or adjustment whenever it is desired to leave the portable article in a stationary position.

In accordance with the present invention, new wheeled mounting means are provided which overcome the disadvantages of the prior art. The mounting means of the invention is constructed so that when used with portable articles the wheels will be automatically locked when the article is placed at rest on a supporting surface. The mounting means of the invention is constructed so that when it is desired to move the portable article, it is merely necessary to lift the device and it can easily be propelled on any surface. Also, the new wheeled mounting means of the invention is so constructed that portable articles can be more easily moved on stairs and the like, such mounting means eliminating much of the bumping usually associated with articles having the common wheel mounting means.

The mounting means of the invention includes a plurality of wheels. The wheels are preferably mounted on spaced axles and the axles are positioned so that the wheels are in frictional tangential contact. This contact is such that when both wheels are in engagement with a surface any tendency to move the supported article will result in a binding relation between the wheels which prevents movement therebetween. When it is desired to move the article, it is merely necessary to lift it so that the wheels on only one axle are in engagement with the supporting surface. The wheel mounting means of the invention has been found particularly desirable for use with portable articles such as riding articles including exercise machines and the like.

It is an object of this invention to provide new mounting means.

Another object of the invention is to provide new wheeled mounting means particularly suitable for portable articles.

A further object of the invention is to provide new wheeled mounting means which can be locked to prevent movement of the supported article.

A still further object of the invention is to provide new mounting means which is particularly advantageous for use on portable articles and which can be moved over irregular surfaces, such as steps and the like.

A still further object of the invention is to provide new wheel mounting means incorporating a self-locking feature which is automatically disengaged when the supporting article is moved.

Various other objects, advantages and features of the invention will become apparent from the following description taken in connection with the accompanying drawings, in which:

FIG. 1 is a side elevation view, partially broken away, of an exercise machine incorporating the new mounting means of the invention.

FIG. 2 is a top plan view partially cut away of the base portion of the apparatus shown in FIG. 1.

FIG. 3 is a transverse cross section view taken along the line 3—3 of FIG. 2.

FIG. 4 is a diagrammatic view illustrating the operation of the wheel mounting means on steps.

The following is a discussion and description of a preferred specific embodiment of the new mounting means of the invention, such being made with reference to the drawings whereon the same reference numerals are used to indicate the same or similar parts and/or structure. It is to be understood that such discussion and description is not to unduly limit the scope of the invention.

The wheel mounting means of the invention has been found particularly desirable for use with portable articles, including portable riding articles such as that shown and described in my copending application entitled Exercise Machine, Serial No. 61,746, filed October 10, 1960.

FIG. 1 of the drawings illustrates a portable article 10 such as the exercise machine described in the before mentioned application. The article 10 has an elongated base member 12, an upper housing 13, and includes a superstructure having a seat 14 and handle bar structure 16. Foot pedals 18 are provided on the exercise machine 10 and the seat 14, handle bar structure 16 and foot pedals 18 are driven by structure mounted on base 12 and within housing 13 of any suitable construction, such being shown in detail in the before mentioned patent application. The base 12 includes a handle 20 or other hand hold means which is used to move the apparatus from place to place. Suitable mounting means, such as a pair of spaced rubber feet 21 are fixedly mounted at the front portion of the base 20 to support same.

The exercise machine 10 is preferably mounted on wheels so as to be portable. This is particularly desirable where the machine is intended for use in private homes since such is desirably moved to an out of the way location during periods of nonuse.

The preferred construction of the wheel mounting means includes two axles 22 and 24 which are generally parallel and in spaced relation. In order to maintain the desired spaced and parallel relation, two reinforcing and spacing members 26 and 28 are provided which are rigidly secured to each of the axles 22 and 24 in any suitable manner, such as by welding. The spacing and reinforcing members 26 and 28 preferably are secured to the tops of the axles as best seen in FIG. 3. The spacing and reinforcing members have holes 30 formed therein which receive mounting bolts 32 or the like to removably secure the wheel mounting means to the lower surface or face of the base 12.

Axle 22 has wheels 34 and 36 rotatably secured thereto and axle 24 has wheels 38 and 40 rotatably secured thereto. The wheels on each of the axles are preferably of like size.

The axles 22 and 24 are preferably spaced apart a distance approximately equal to the sum of the radii of the wheels mounted thereon so that the wheels when mounted are in tangential frictional engagement. When the wheels are of the pneumatic type, the distance between axles can be reduced slightly so as to compensate for any flattening of the tires as they are placed in contact. The axles 22 and 24 are mounted on the base 12 so that each of the wheels is in engagement with the supporting surface when the machine is in normal position on a relatively flat surface.

When the apparatus is in the position shown in FIG. 1 and all of the wheels are in engagement with the supporting surface, any attempt to move the device forward without lifting will result in the moments of force indicated by the arrows in FIG. 1 of the drawings. Thus, it will be seen that both wheels are tending to rotate in a clockwise direction and the tangential frictional engagement between the wheels at the point of contact with each other will be such as to positively prevent any movement of the apparatus. When it is desired to move the supported article, it is merely necessary to lift the base 12 by using the handle 20 so that the wheels on one of the axles are no longer in contact with the supporting surface. The binding frictional engagement between the wheels and the supporting surface will then be eliminated and the device can easily be pulled, causing the wheels that are in contact to rotate in opposite directions. When base 12 is again lowered so that the feet 21 are in engagement with the supporting surface, the before mentioned frictional tangential locking engagement between the wheels will again occur and prevent inadvertent and accidental movement of the device during operation.

The wheel mounting means described hereinabove is particularly advantageous for use on articles which are moved or transported over stairs. FIG. 4 of the drawings diagrammatically illustrates the operation of the wheel means during movement of the article up the stairs. The stairs are shown at 42. As the sets of wheels reach the first of the steps 42, the wheel 38 will first engage the step, and as motion is continued upwardly the lower or rear wheel 34 will be lifted off of the ground or supporting surface and the weight of the apparatus will be carried by the wheel 38. As wheel 38 travels up and over the step 42 the rear wheel 34 will then engage step 42, as shown in the upper or right hand portion of FIG. 4 so that the weight of the apparatus is then carried by wheel 34. As the weight of the apparatus is transferred from the wheels on one axle to the wheels on another axle the direction of rotation of the wheels is instantaneously reversed as indicated by the arrows in FIG. 4. This occurs since the free wheel or the one not in engagement with the steps is driven by the wheel supporting the weight of the apparatus and in engagement with the steps. It is also observed that when using the wheel mounting means of the invention bumping and the like usually associated with movement of a device or apparatus up stairs will be substantially diminished since there is very little movement when one or the other of the wheels is not in engagement with an edge of the stairs 42. This, of course, results in substantially less jarring of the apparatus and represents a decided improvement or advantage over the prior art devices.

The wheel mounting means of the invention has been described in connection with the use of an exercising machine or the like, however it will be apparent to those skilled in the art that the wheel mounting means as such can be advantageously applied to numerous portable or semi-portable articles. The axles 22 and 24 and spacing members 26 and 28, with or without the wheels thereon, can be constructed and sold as a unit for mounting on any suitable apparatus. Also, in some instances the spacing and reinforcing members 26 and 28 can conveniently be made adjustable in any suitable manner so as to take up for wear of the tires during operation and/or to make the wheel mounting means adjustable for use with a plurality of sizes of wheels. The members 26 and 28 have been described as reinforcing and spacing members, however it will be apparent that in some instances the reinforcing value of these members is negligible, and in such instances the size or strength of materials used to form them can be substantially reduced.

The improved wheel mounting means can also be provided without the use of the spacing members 26 and 28, although such have been found desirable in forming composite units. In these instances, the axles 22 and 24 can be mounted in any suitable manner directly onto the supported article, such as onto the lower surface or face of the member 12. The axles should be mounted thereon so that the wheels are in frictional engagement as described hereinabove. Also, while the wheel mounting means has been described in connection with two axles having contacting wheels mounted thereon it will be apparent that more than two axles can be utilized if desired, such not only resulting in a more positive positioning of the apparatus due to the increased total friction between the wheels, but also the device can often be more easily moved over irregular surfaces, such as stairs and the like, due to the fact that one of the wheels will nearly always be in contact with the edge of the step or the like.

While the invenion has been described in connection with a preferred specific embodiment thereof, it will be understood that this description is intended to illustrate and not to limit the scope of the invention which is defined by the claims.

I claim.

1. A wheel mounted portable riding article comprising, in combination, an integrally formed elongated base of plastic material, superstructure mounted thereon for supporting a human being, hand hold means for lifting the front end portion of said base, a pair of spaced rubber feet fixedly mounted on said front end portion of said base, two stationary axles disposed in parallel spaced relation, two spaced reinforcing and spacing members extending between and rigidly secured to end portions of said axles, said reinforcing and spacing members being secured to the lower surface of said base at the rear thereof, four wheels of like size, each end portion of each of said axles receiving one of said wheels for rotation thereon, said wheels at like end portions of said axles being in tangential frictional engagement at all times with each of said wheels being engageable with a common supporting surface when said article is at rest, said article being constructed and adapted so that when said wheels are resting on a common surface forward or rearward movement of said wheels and said article will be prevented due to the frictional engagement between said wheels, and said article can be moved by lifting said base by said hand hold means and said wheels on one of said axles from the surface so that only said wheels on the other of said axles will be in engagement with the surface.

2. A wheel mounted portable riding article comprising, in combination, an elongated base, superstructure mounted on said base for supporting a human being, hand hold means at one end of said base, feet supporting said one end of said base, two stationary axles disposed in parallel relation, spacing members extending between and secured to said axles, said spacing members being secured to the other end portion of said base, four wheels, each end portion of each of said axles rotatably mounting one of said wheels, said wheels on one of said axles being in tangential frictional engagement at all times with like wheels on the other of said axles with each of said wheels being engageable with a common supporting surface when said article is at rest, said article being constructed and adapted so that when said wheels are resting on a common surface movement of said article will be prevented due to the frictional engagement between said wheels, and said article can be moved by lifting said base so that only said wheels on one of said axles engages the supporting surface.

3. Wheel mounting means comprising, in combination, two axles, said axles being positioned in parallel spaced relation, two spaced reinforcing and spacing members extending between and rigidly secured to the end portions of said axles and fixedly mounting same in spaced relation, four wheels of equal size, each end portion of each of said axles receiving one of said wheels for rotation thereon, said wheels at like end portions of said axles being in tangential frictional engagement at all times and engageable with a common supporting surface, said wheel mounting means being constructed and adapted so that said frictional engagement between said wheels will prevent movement of said wheel mounting means when said wheels are resting on a common surface.

4. Wheel mounting means comprising, in combination, two axles, two spacing members extending between and rigidly secured to the end portions of said axles to fixedly position said axles in parallel spaced relation, four wheels, each end portion of said of said axles receiving one of said wheels for rotation thereon, said wheels on one of said axles being in tangential friction engagement with said wheels on the other of said axles at all times with said wheels being engageable with a supporting surface in operation, said wheel mounting means being constructed and adapted so that said frictional engagement between said wheels will prevent movement of said wheels when said wheels are resting on a surface.

5. Wheel mounting means comprising, in combination, a plurality of spaced axles, spacing members secured to said axles normally fixedly spacing same in generally parallel relation, the end portions of each of said axles having wheels rotatably mounted thereon, said wheels at like end portions of said axles being in tangential frictional engagement at all times and engageable with a supporting surface so that when said wheels are resting on a supporting surface said wheel mounting means will be prevented from movement.

6. A portable article comprising, in combination, a base, a plurality of spaced axles, means connected to said axles mounting same on said base a fixed distance apart and in generally parallel relation, a first circular wheel mounted on one of said axles with said axle passing centrally through said wheel, a second circular wheel mounted on the other of said axles generally opposite and coplanar with said first wheel and with said other axle centrally passing through said second wheel, the edges of said wheels being in tangential frictional engagement in all positions so that when said wheels are resting on and in contact with a supporting surface said wheels are stationary relative one another.

7. Wheel mounting means comprising, in combination, a plurality of spaced axles, means connected to said axles mounting same a fixed distance apart and in generally parallel relation, a first circular wheel mounted on one of said axles with said axle passing centrally through said wheel, a second circular wheel mounted on the other of said axles generally opposite and coplanar with said first wheel and with said other axle centrally passing through said second wheel, the edges of said wheels being in tangential frictional engagement in all positions so that when said wheels are resting on and in contact with a supporting surface said wheels are stationary relative one another.

References Cited in the file of this patent
UNITED STATES PATENTS

| | | |
|---|---|---|
| 1,084,976 | Stetler | Jan. 20, 1914 |
| 1,887,427 | Porcello | Nov. 8, 1932 |
| 2,380,181 | Krenzien | July 10, 1945 |
| 2,494,039 | Feather | Jan. 10, 1950 |
| 2,714,934 | Cassady | Aug. 9, 1955 |
| 2,868,558 | Krauss | Jan. 13, 1959 |

UNITED STATES PATENT OFFICE

CERTIFICATE OF CORRECTION

Patent No. 3,096,852                                  July 9, 1963

Richard J. Harwood

It is hereby certified that error appears in the above numbered patent requiring correction and that the said Letters Patent should read as corrected below.

Column 5, line 11, for "said", first occurrence, read -- each --.

Signed and sealed this 7th day of January 1964.

(SEAL)
Attest:

ERNEST W. SWIDER

Attesting Officer

EDWIN L. REYNOLDS

Acting Commissioner of Patents